United States Patent Office 3,554,990
Patented Jan. 12, 1971

---

3,554,990
ESTERS OF 2-CYANOPENTA-2,4-DIENOIC ACID AND POLYMERS THEREOF
Edwin K. Quinn and Gary F. Hawkins, Kingsport, Tenn., assignors to Eastman Kodak Company, Rochester, N.Y., a corporation of New Jersey
No Drawing. Filed June 10, 1968, Ser. No. 735,557
Int. Cl. C08f *3/74*
U.S. Cl. 260—88.7      13 Claims

ABSTRACT OF THE DISCLOSURE

Novel esters of 2-cyanopenta-2,4-dienoic acid having the structural formula $$CH_2=CH-CH=\underset{\underset{CN}{|}}{C}-\underset{\underset{O}{\|}}{C}-OR$$

wherein R is an alkenyl group of 2–10 carbon atoms or an alkoxy substituted alkyl group of 2–10 carbon atoms. These esters are useful as adhesives for general and particularly for surgical uses. These compounds are particularly characterized by the fact that they are autopolymerizable and produce strong, flexible bonds which are highly resistant to fracture under impact.

---

This invention relates to novel esters of 2-cyanopenta-2,4-dienoic acid and more particularly to the use of such compounds as general adhesives. More particularly, the invention relates to compositions which are useful as surgical adhesives.

As is well known, the esters of alpha-cyanoacrylic acid have been found to be useful as adhesives for general industrial applications and also in the surgical field. The medical and patent literature has disclosed that certain of these alpha-cyanoacrylates can be successfully used in many surgical applications as, for example, in the setting of fractured bone structures, as substitutes for, or adjuncts to, surgical sutures, in retarding the flow of blood from wounds and as aids in the repair and regrowth of living tissue generally.

Recently esters of 2-cyanopenta-2,4-dienoic acid have been disclosed in the patent and technical literature as having adhesive properties. Such esters are, for example, disclosed in U.S. Pat. to Gerber No. 3,316,227. The esters therein disclosed are alkyl 2 - cyanopenta-2,4-dienoates which are solids at room temperature that have little, if any, advantages as adhesives as compared to the above-mentioned and well known alkyl 2-cyanoacrylates. Notwithstanding their many valuable properties, the alkyl cyanocrylates have certain deficiencies, one being that the adhesive bonds resulting from their uses are in some cases not sufficiently flexible to meet the demands of certain surgical and other adhesive applications. Because of their relative inflexibility, adhesive bonds on rigid substrates have low impact strength. The above-mentioned alkyl 2-cyanopenta-2,4-dienoates exhibit similar disadvantages and their application as adhesives is necessarily more difficult since they are solids at room temperature.

As will be more fully set forth hereinafter, the novel compounds of the instant invention exhibit wholly unexpected properties in that they are liquids at room temperature and the bonds formed when they are used as adhesives are sufficiently elastic to flex as the contour of the substrate is changed.

This invention has as an object to provide novel esters of 2-cyanopenta-2,4-dienoic acid useful as monomers for the production of polymeric adhesive compositions.

A further object is to provide 2-cyanopenta-2,4-dienoate ester adhesive compositions adapted for general and particularly for surgical applications.

A further object is to provide esters of 2-cyanopenta-2,4-dienoic acid which are autopolymerizable to produce polymeric adhesive bonds between a wide variety of the same or dissimilar materials and having high impact strength and a high degree of flexibility.

A still further object is to provide laminated articles comprising two or more elements bonded together with a flexible bond of high strength and having a high resistance to fracture on impact or shock.

Another object is to provide articles comprising a substrate having thereon an in situ polymerized coating or layer which is flexible and of high strength.

A specific object is to provide autopolymerizable alkenyl esters of 2-cyanopenta-2,4-dienoic acid useful as general and surgical adhesives.

Another specific object is to produce autopolymerizable alkoxyalkyl esters of 2-cyanopenta-2,4-dienoic acid useful as general and surgical adhesives.

Other objects will appear hereinafter.

These objects are accomplished by the following invention which, in its broader aspects, comprises providing alkenyl and alkoxy-substituted alkyl esters of 2-cyanopenta-2,4-dienoic acid and the employment of these esters as adhesives in various applications, including medical or surgical use, to produce autopolymerized bonds having a high degree of flexibility and high shock or impact resistances. These esters can be employed in various adhesive compositions for bonding a wide variety of different substrates, as for example, metals such as iron, steel, aluminum, copper, brass and many others where the bond is between the same or different metals. Likewise, they may be employed for bonding wood, rubber, plastics, glass, animal tissues and the like either to like or dissimilar substrates such as any of those herein set forth.

Because of the fact that the bonds obtainable through the employment of the alkenyl and alkoxy-substituted alkyl esters of 2-cyanopenta-2,4-dienoic acid of the invention have a high degree of flexibility as well as a high resistance to fracture as a result of shock or impact, they are particularly valuable for use as surgical adhesives, especially in those cases where ability to flex without fracture as the contour of the substrate changes is important. More specifically, these esters have especial value as substitutes for, or adjuncts to, surgical sutures in various applications. In general, the novel compositions herein described can be employed in a wide range of applications in which the alkyl cyanoacrylates have been found to be useful.

The esters of 2-cyanopenta-2,4-dienoic acid of the present invention may be prepared in accordance with the procedure set forth in U.S. Pat. 3,316,227 by reacting an appropriate 2-cyanoacetate with acrolein in the presence of a catalyst such as zinc chloride in accordance with the following equation:

$$RO-\underset{\underset{}{\|}}{\overset{O}{C}}-CH_3-CN + H-\underset{\underset{}{\|}}{\overset{O}{C}}-CH=CH_2 \xrightarrow[\text{Dioxane}]{ZnCl_2}$$

$$RO-\underset{\underset{}{\|}}{\overset{O}{C}}-\underset{\underset{CN}{|}}{C}=CH-CH=CH_2 + H_2O$$

wherein R is an alkenyl group of 2–10 carbon atoms typified by $R=-CH_2-CH=CH_2$, or an alkoxy-substituted alkyl group of 2–10 carbon atoms typified by $$-CH_2-CH_2-\underset{\underset{OR}{|}}{C}H-CH_3$$

The following examples are included for a better understanding of the invention.

EXAMPLE 1

Preparation of 3 - methoxybutyl 2 - cyanopenta - 2,4-dienoate.—Five grams (0.037 mole) of zinc chloride is stirred into 20 ml. of 1,4-dioxane and to the mixture is added 10.3 g. (0.06 mole of 3 - methoxybutyl cyanoacetate followed by the addition of 5.0 ml. (0.075 mole) of acrolein. Stirring of the mixture is continued at room temperature for 3.5 hours and it is then diluted with 50 ml. of ligroin. The mixture is then poured into a separatory funnel and washed with 100 ml. of 10% hydrochloric acid causing three layers to separate. The two lower layers are discarded and the upper layer (ligroin) washed with two 100 ml.-portions of dilute hydrochloric acid and dried over anhydrous calcium chloride. The drying agent is removed by filtration and the ligroin solution concentrated in a rotary evaporator to leave 5.0 g. (43% yield) of liquid material, B.P. 95–105°/0.3–0.5 mm. Hg. The infrared and nuclear magnetic resonance spectra of the liquid are consistent with the proposed structure.

EXAMPLE 2

Preparation of allyl 2 - cyanopenta-2,4-dienoate.—Five grams (0.037 mole) of zinc chloride is stirred into 20 ml. of 1,4-dioxane and to the mixture is added 6.78 g. (0.06 mole) of allyl cyanoacetate followed by the addition of 5.0 ml. (0.075 mole) of acrolein. Stirring of the mixture is continued at room temperature for 3.5 hours and it is then worked up in the same manner as set forth in Example 1 to yield 2.5 g. (26% yield) of liquid material, B.P. 62–66°/0.03 mm. Hg. The infrared and nuclear magnetic resonance spectra of the liquid are consistent with the proposed structure.

EXAMPLE 3

2 - methoxyethyl 2 - cyanopenta - 2,4 - dienoate having similar properties to the esters prepared as described in Examples 1 and 2 is prepared by employing the same preparative procedures and conditions of Examples 1 and 2.

EXAMPLE 4

This example illustrates the use of the novel compositions of matter of the present invention as adhesives and particularly establishes the superior impact strength of bonds produced by employment of these compositions as compared to the impact strengths of bonds obtainable by use as adhesives of alpha-cyanoacrylates and alkyl 2-cyanopenta - 2,4-dienoates. The test procedure employed to determine the relative impact strengths obtainable by employment as adhesives of each of the substances listed in the following table is A.S.T.M. Test Procedures D–950. In each test the monomer is spread upon the surface of one of the test substrates at room temperature and the treated surface then brought into contact with the surface of the substrate to be adhesively bonded thereto. All of the adhesive compositions tested are liquids at room temperature except ethyl 2-cyanopenta-2,4-dienoates which is a solid at room temperature and which requires heating to approximately 50° C. to obtain sufficient fluidity or flowability to enable it to be spread on the test substrate. The results obtainable by this procedure are listed in the following table:

| Material | Curing time, hrs. | Inch±Pounds |
| --- | --- | --- |
| Allyl 2-cyanopenta-2,4-dienoate | 20 | 15.02±3.76 |
|  | 70 | 15.02±2.49 |
| 3-methoxybutyl 2-cyanopenta-2,4-dienoate | 20 | 13.05±1.33 |
|  | 70 | 9.78±1.40 |
| Ethyl 2-cyanopenta-2,4-dienoate | 20 | 9.78±1.05 |
|  | 70 | 5.23±1.77 |
| Methyl 2-cyanoacrylate | 20 | 7.48±0.82 |
|  | 70 | 6.18±0.73 |

EXAMPLE 5

This example illustrates the use of the novel esters of 2-cyanopenta-2,4-dienoic acid of the present invention as medical or surgical adhesive. Approximately 50 mg. of fluid monomer is uniformly spread over an area of approximately 1.5 cm. x 1.5 cm. on strips of skin from a freshly slaughtered calf and the strips of the treated skin are brought together with the coated surfaces in contact. The sample is then placed under mild finger pressure for one minute and subjected to qualitative lap shear tests by pulling the strips apart by hand. The results are recorded in the following table:

| Material: | Adhesive bond |
| --- | --- |
| Allyl 2-cyanopenta-2,4-dienoate | Very good |
| 3-Methoxybutyl 2-cyanopenta-2,4-dienoate | Very good |
| Isobutyl 2-cyanoacrylate | Fair-to-good |

EXAMPLE 6

This example illustrates the high shear strength of bonds resulting from the use as adhesives of the novel esters of 2-cyanopenta-2,4-dienoates of the invention and mixtures thereof with alkenyl cyanoacrylates in a typical industrial application in which the bonds were formed between two steel plates. The example also illustrates the higher shear strength obtainable with these esters as compared to shear strengths obtainable by the use of alkyl 2-cyanopenta-2,4-dienoates. The procedure employed in obtaining the data shown in the following table was that described in ASTM Test D–1002–53T, except that a bonded area of 0.25 square inches was employed

| Adhesive(s): | Average sheer strength[1] |
| --- | --- |
| Ethyl 2-cyanopenta-2,4-dienoate | 853 |
| Allyl 2-cyanopenta-2,4-dienoate | 1920 |
| 3-methoxybutyl 2-cyanopenta-2,4-dienoate | 710 |
| 50% allyl α-cyanoacrylate+50% ethyl 2-cyanopenta-2,4-dienoate | 1120 |
| 50% allyl α-cyanoacrylate+50% allyl 2-cyanopenta-2,4-dienoate | 2630 |
| 50% allyl α-cyanoacrylate+50% 3-methoxybutyl 2-cyanopenta-2,4-dienoate | 1530 |

[1] P.S.I for steel-steel bonds cured at 100° C. for twenty-four hours.

It will be apparent from the above data that the alkenyl and alkoxy alkyl esters of 2-cyanopenta-2,4-dienoic acid have markedly superior impact strengths as compared to the alkyl esters of 2-cyanopenta-2,4-dienoic acid or the alpha-cyanoacrylic acid derivatives.

Although we have chosen to illustrate our invention by reference to the 2-cyanopenta-2,4-dienoates, as such, it will be evident to those skilled in the art to which this invention relates that various additives may be included in the adhesive compositions herein described. For example, it may be desirable to add small quantities of stabilizers or polymerization inhibitors, such as hydroquinone or hydroquinone derivatives such as butylated hydroxyanisole, butylated hydroxy toluene and the like. Similarly, small quantities of acid stabilizers may be employed for this purpose, if desired. In addition, various plasticizers, thickening agents or viscosity modifiers may be added in appropriate amounts, the actual amount in a given case being dependent on the end use of any particular adhesive composition it may be desired to produce.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. A monomeric autopolymerizable ester of 2-cyano-penta-2,4-dienoic acid having the structural formula:

$$RO-\underset{\parallel}{C}-\underset{\mid}{C}=CH-CH=CH_2$$
$$\phantom{RO-}O\phantom{-}CN$$

wherein R is an alkenyl group of 2–10 carbon atoms or an alkoxy-substituted alkyl group of 2–10 carbon atoms.

2. A monomeric ester of claim 1 in which R is an alkenyl group of 2–10 carbon atoms.

3. A monomeric ester of claim 1 in which R is an alkoxy-substituted alkyl group of 2–10 carbon atoms.

4. A polymer of ester defined by claim 1.

5. A polymer of the ester defined by claim 2.

6. A polymer of the ester defined by claim 3.

7. A composite article comprising at least two elements bonded together by the polymer defined in claim 4.

8. A composite article comprising at least two elements bonded together by the polymer defined in claim 5.

9. A composite article comprising at least two elements bonded together by the polymer defined in claim 6.

10. A monomeric ester of claim 1 in which R is allyl.

11. A polymer of the ester defined by claim 10.

12. A monomeric ester of claim 1 in which R is 3-methoxybutyl or 2-methoxyethyl.

13. A polymer of the ester defined in claim 12.

References Cited

UNITED STATES PATENTS

| | | | |
|---|---|---|---|
| 2,763,585 | 9/1956 | Coover et al. | 260—88.7 |
| 2,768,109 | 10/1956 | Coover | 260—88.7 |
| 3,316,227 | 4/1967 | Gerber | 260—465.9 |

HARRY WONG, Jr., Primary Examiner

U.S. Cl. X.R.

117—124, 128.4, 138.8, 139, 148; 156—331; 161—247; 260—45.95, 85.5, 465.9